United States Patent [19]

Komons et al.

[11] Patent Number: 4,494,406
[45] Date of Patent: Jan. 22, 1985

[54] MEANS FOR MEASURING LARGE AREA MASS FLOW

[75] Inventors: Michael Komons, Peapack; Donald F. Wiseman, Bernardsville, both of N.J.; Andreas I. Galanis, Edgewood, Md.

[73] Assignee: Ebtron, Inc., Somerset, N.J.

[21] Appl. No.: 452,790

[22] Filed: Dec. 23, 1982

[51] Int. Cl.³ .............................. G01F 1/68
[52] U.S. Cl. ............................ 73/204; 338/7; 338/9; 338/22 R
[58] Field of Search ............ 73/204; 338/7, 9, 22 R, 338/25

[56] References Cited

U.S. PATENT DOCUMENTS

| 1,218,205 | 3/1917 | Packard | 73/204 |
| 1,240,797 | 9/1917 | Tatum | 73/204 |
| 3,472,080 | 10/1969 | Webb | 73/204 |
| 4,213,335 | 7/1980 | Peter et al. | 73/204 |
| 4,279,147 | 7/1981 | Djorup | 73/204 X |

FOREIGN PATENT DOCUMENTS 55-43447  3/1980  Japan ................... 73/204

Primary Examiner—James L. Rowland
Assistant Examiner—Brian R. Tumm
Attorney, Agent, or Firm—Charles E. Temko

[57] ABSTRACT

Improved structure for measuring the air flow in large conduits, such as those used to supply air conditioning and heating ducts, by sampling substantially all of the cross sectional area of the conduit in a given transverse plane to obtain an average electrical signal which is compared with a reference signal to obtain a measured voltage corresponding to average flow.

1 Claim, 5 Drawing Figures

MEANS FOR MEASURING LARGE AREA MASS FLOW

BACKGROUND OF THE INVENTION

This invention relates generally to the field of flow measurement of fluids, and more particularly to an improved means for sampling air flow in a large heating and/or cooling system, as measured by an electrical current flow proportional to average flow in the conduit. With some modification, the means may be also used for measuring liquid flow as well.

In known devices, usually referred to as anemometers, a measuring wire is heated and exposed to the flowing medium. A certain amount of cooling is experienced which can be related to the flow velocity of the medium. The cooling effect is evidenced by a change in electrical resistance of the wire.

In a large cross section conduit of flowing air, such a device can measure only the velocity at a particular point of measurement, and if the flow is turbulent or uneven in distribution, the measurement cannot be representative of the average flow in the conduit.

SUMMARY OF THE INVENTION

Briefly stated, the invention contemplates the provision of an improved means for measuring air flow within a conduit having a large cross sectional area in terms of a measurable electrical signal. Incorporated into the conduit is a network of temperature dependent resistors connected in series, which may be thermistors or hot wire elements which carry an electrical current of controlled magnitude. A controller including a differential amplifier maintains the current through the resistor network at a constant value such that the resistors are heated to a constant temperature, assuming no air flow. This constant temperature results in a constant resistance value across the network. A second temperature dependent resistor is placed such that it will not be influenced by air flowing in the conduit, thereby responding only to changes in ambient temperature and thus serving as a temperature compensator. When a flow of air is introduced through the conduit, a cooling effect will be experienced by the resistor network which is sensed by the controller which produces a change in electrical output that is indicative of the average mass flow of air through the conduit.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENTS

Figure 1:
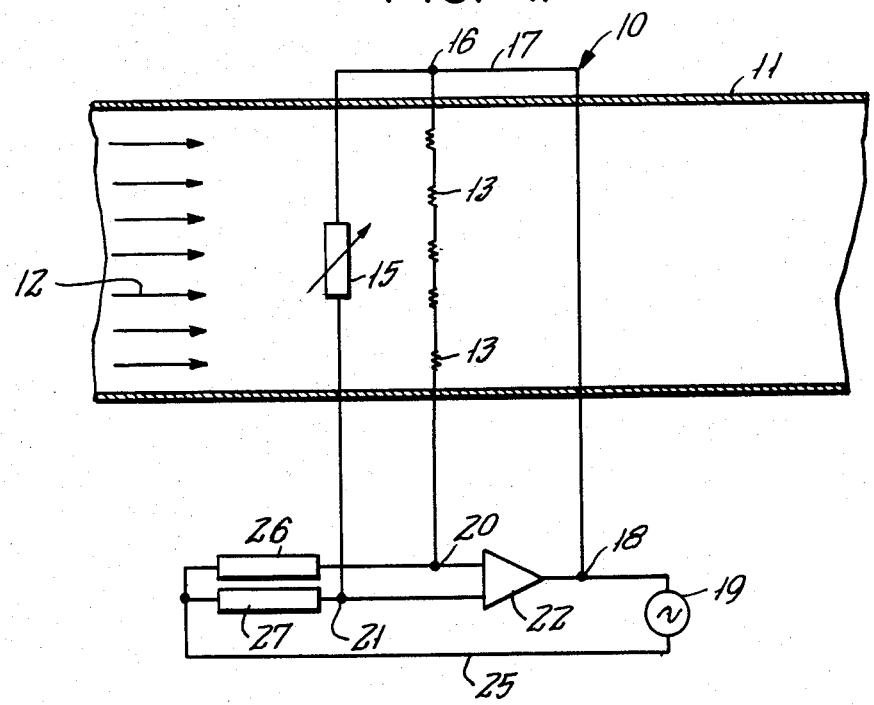
FIG. 1 is a schematic view of a first embodiment of the invention.

In accordance with the first embodiment of the invention, the device, generally indicated by reference character 10, and schematically illustrated in FIG. 1 is installed in a generally rectangularly shaped air conditioning unit 11 through which air flows in the direction indicated by arrows 12.

Lying in the path of the air flow is a plurality of measuring resistors 13 which are connected in series. A temperature compensating resistor 15 is provided with a shield to prevent direct exposure of the resistor to the air flowing within the conduit, but nevertheless sensitive to changes in ambient temperature. The resistors 13 and 15 are connected at point 16, by a conductor 17 connected at point 18 leading to the input of a volt meter 19.

The resistors 13 are connected at point 20 to one side of the input while the resistor 15 is connected at point 21 to the other side of the input of a powered differential amplifier 22. A return conductor 25 leads to fixed resistors 26 and 27 which provide a feedback to the differential amplifier 22.

During operation, the differential resistance between the resistors 13 and the resistor 15 will be a direct result of the amount of air flowing past the former from which the latter is shielded. This difference is measured by the differential amplifier 22, and the resultant output therefrom readable on the volt meter 19 will indicate, with callibration, the amount of flow in the conduit 11.

Figure 2:
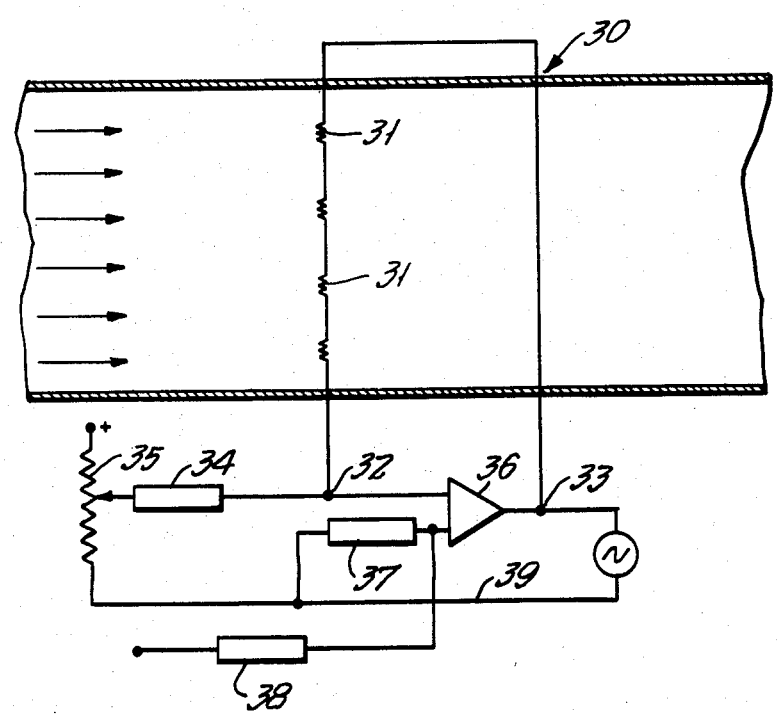
FIG. 2 is a schematic view of a second embodiment of the invention.

In the second embodiment, shown in FIG. 2, generally indicated by reference character 30, the measuring resistors 31 are placed within the conduit, as in the case of the first embodiment, and the connections at points 32 and 33 correspond to those of the first embodiment. The temperature compensating resistor 34 is, however, placed outside of the conduit, and is fed through an adjustable resistor 35 to the same side of the differential amplifier 36. Fixed resistors 37 and 38 are connected in parallel to the second side of the differential amplifier, one being fed from the conductor 39 by feedback from the volt meter, and the other being fed by an independent voltage source.

The operation of the second embodiment is similar to that of the first, in that the temperature sensitive resistors are exposed to the flow of air in the conduit, and the compensating resistor is sensitive only to changes in the ambient air.

Figure 3:
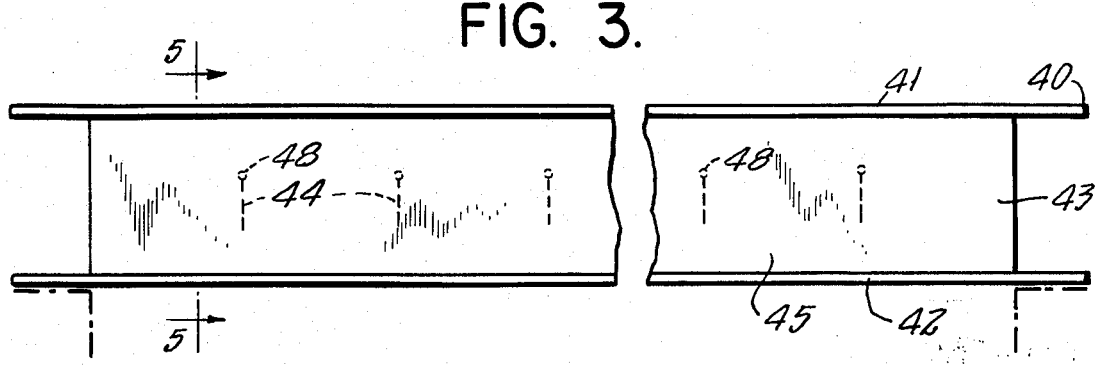
FIG. 3 is an elevational view of the embodiment ready for installation in an air flow conduit.
Figure 4:
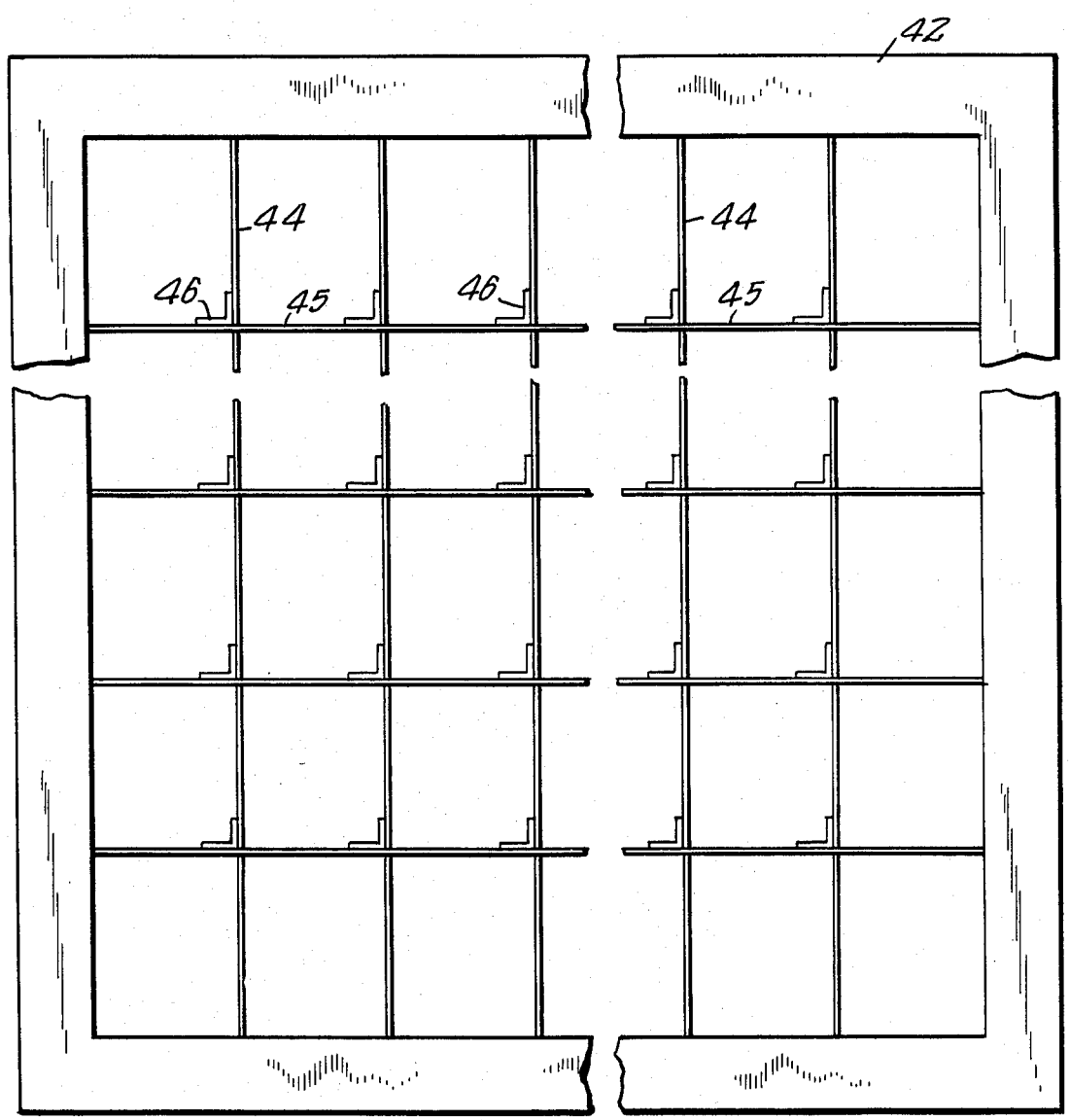
FIG. 4 is a top plan view thereof.
Figure 5:
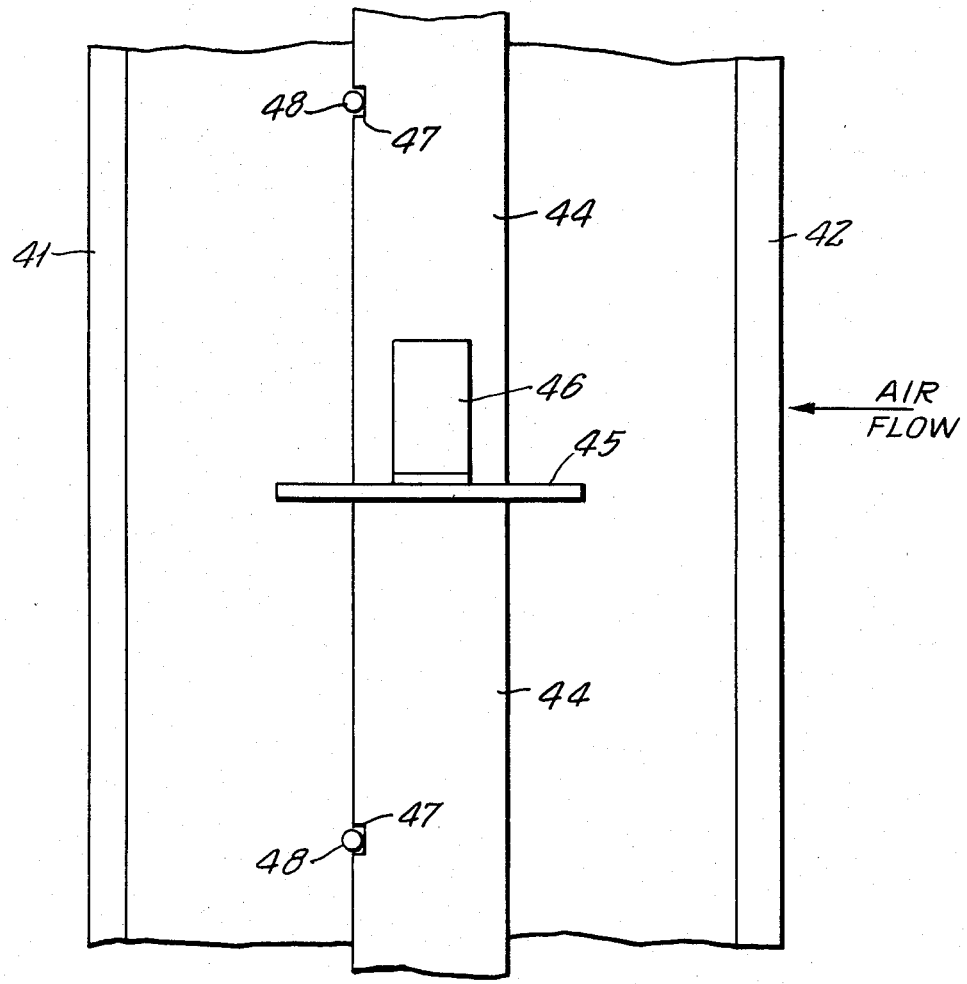
FIG. 5 is an enlarged fragmentary sectional view as seen from the plane 5—5 in FIG. 4.

FIG. 3 illustrates an assembly which may be incorporated into an air conditioning conduit at a suitable location. It includes a rectangular frame 40 having first and second frame members 41 and 42 which support an assembly 43 through which the air flow passes. The assembly 43 includes a plurality of vertical members 44 and horizontal members 45, the interconnection of which creates a plurality of small rectangularly shaped zones, each of which may contain a temperature sensitive resistor. The horizontal and vertical members may be interconnected by angularly shaped members 46. The vertical members include at a trailing edge (relative to the air flow) small recesses 47 which accommodate thermistor beads 48 which are thereby shielded from contact from particulate matter which might be carried by the air stream (see FIG. 5). This location has the added advantage of increased sensitivity due to increased boundary layer flow and greater turbulence at the trailing edge of the vertical members.

With minor modification, the invention may also be used in conjunction with conduits of generally circular cross section by merely reshaping the assembly, and providing measured area of rectangular or other shape.

We wish it to be understood that we do not consider the invention limited to the precise details of structure shown and set forth in this specification, for obvious modifications will occur to those skilled in the art to which the invention pertains.

We claim:

1. In an improved means for measuring fluid flow over a large cross-sectional area of a conduit including a plurality of first temperature-sensitive electrical resistors connected in series, and located within said area at various locations in a given plane perpendicular to the direction of fluid flow, said resistors being exposed to said fluid flow; a second temperature-sensitive resistor shielded from fluid flow so as to be temperature sensitive only to changes in ambient temperatures, differential amplifier means for comparing the resistive values of said first and second resistors during current flow, and producing a voltage output representing the difference in resistive values; and calibrated galvanometer means for reading said difference in resistive values in terms of fluid flow; the improvement comprising: a frame assembly corresponding in configuration to the cross-sectional area of the conduit and including a plurality of support members interconnected substantially at mutual right angles, at least some of which supports said first resistors at generally uniformly spaced intervals; said resistors being in the form of thermistor beads, said support members having leading and trailing edges, relative to the direction of fluid flow, said trailing edges having recesses therein, said thermistor beads being located within said recesses to be thereby shielded from particulate matter in fluid passing over said support member.

* * * * *